(12) United States Patent
Shepler

(10) Patent No.: US 8,682,562 B2
(45) Date of Patent: Mar. 25, 2014

(54) TURBINE ENGINE THRUST SCHEDULING

(75) Inventor: Angela J. Shepler, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 992 days.

(21) Appl. No.: 12/775,586

(22) Filed: May 7, 2010

(65) Prior Publication Data

US 2010/0287905 A1  Nov. 18, 2010

Related U.S. Application Data

(60) Provisional application No. 61/176,680, filed on May 8, 2009.

(51) Int. Cl.
*F02C 9/00* (2006.01)

(52) U.S. Cl.
USPC .......................................... 701/99; 60/39.24

(58) Field of Classification Search
None
See application file for complete search history.

(56) References Cited

U.S. PATENT DOCUMENTS

| | | | | |
|---|---|---|---|---|
| 3,852,956 A * | 12/1974 | Martin | ......................... | 60/39.15 |
| 3,908,363 A * | 9/1975 | Bauerfeind | ..................... | 60/237 |
| 4,277,041 A * | 7/1981 | Marrs et al. | ..................... | 244/182 |
| 4,380,898 A * | 4/1983 | Cantwell | ..................... | 60/243 |
| 4,382,282 A * | 5/1983 | Graham et al. | ................. | 701/11 |
| 4,401,075 A * | 8/1983 | O'Keefe et al. | ............... | 123/352 |
| 4,437,303 A * | 3/1984 | Cantwell | ..................... | 60/39.281 |
| 4,536,843 A * | 8/1985 | Lambregts | ......................... | 701/3 |
| 4,799,159 A * | 1/1989 | Davidson et al. | ............... | 701/14 |
| 4,875,168 A * | 10/1989 | Martin | ............................ | 701/99 |
| 5,029,778 A * | 7/1991 | DeLuca | .......................... | 244/234 |
| 5,039,037 A * | 8/1991 | DeLuca | .......................... | 244/234 |
| 5,277,024 A * | 1/1994 | Bissey et al. | ................ | 60/39.281 |
| 5,715,789 A * | 2/1998 | Naruke et al. | ................ | 123/320 |
| 5,908,176 A * | 6/1999 | Gilyard | ........................... | 244/203 |
| 6,088,632 A * | 7/2000 | Zaccaria et al. | ................... | 701/3 |
| 6,434,473 B1 | 8/2002 | Hattori | | |
| 6,459,963 B1 * | 10/2002 | Bennett et al. | ..................... | 701/3 |
| 6,536,411 B2 * | 3/2003 | Ganser et al. | ............ | 123/406.44 |
| 6,578,794 B1 * | 6/2003 | Clark et al. | .................. | 244/75.1 |
| 6,931,835 B2 * | 8/2005 | Chapman et al. | ............ | 60/226.1 |
| 7,140,175 B2 * | 11/2006 | Verniau | ........................... | 60/243 |
| 7,237,382 B2 | 7/2007 | Muramatsu et al. | | |
| 7,246,495 B2 | 7/2007 | Muramatsu et al. | | |
| 7,431,243 B1 * | 10/2008 | Allen | ............................ | 244/195 |
| 7,711,455 B1 * | 5/2010 | Cogan | .............................. | 701/3 |

(Continued)

OTHER PUBLICATIONS

EIC Fast and Focused Search Report.*

(Continued)

*Primary Examiner* — Fadey Jabr
*Assistant Examiner* — Krishnan Ramesh
(74) *Attorney, Agent, or Firm* — Neal, Gerber & Eisenberg LLP

(57) ABSTRACT

This invention relates generally to gas turbine engine thrust scheduling, and more particularly to systems and methods for smoothing thrust inputs to gas turbine engines. In one embodiment, a method for operating a gas turbine engine comprises, upon disengagement of an auto-throttle system, determining a first trim setting corresponding to a TLA setting, determining a second trim setting where the second trim setting reduces to zero during successive manual throttle lever movements, determining a third trim setting comprising a combination of the first trim setting and the second trim setting, and applying the third trim setting to the TLA setting to smoothly transition from auto-throttle to manual operation of the engine while maintaining engine thrust.

21 Claims, 5 Drawing Sheets

(56) References Cited

U.S. PATENT DOCUMENTS

| | | |
|---|---|---|
| 2002/0179055 A1* | 12/2002 | Ganser et al. ............ 123/406.44 |
| 2003/0078875 A1* | 4/2003 | Moore et al. .................... 705/37 |
| 2003/0192302 A1* | 10/2003 | Chapman et al. ............... 60/204 |
| 2004/0039704 A1* | 2/2004 | Gilliam et al. ................. 705/50 |
| 2005/0167175 A1* | 8/2005 | Isaji et al. ..................... 180/170 |
| 2005/0217273 A1* | 10/2005 | Muramatsu et al. ............ 60/773 |
| 2005/0217274 A1* | 10/2005 | Muramatsu et al. ............ 60/773 |
| 2006/0281375 A1* | 12/2006 | Jordan ............................ 440/38 |
| 2008/0147251 A1* | 6/2008 | Luo .................................. 701/3 |
| 2008/0149778 A1* | 6/2008 | Calandra et al. ............. 244/175 |
| 2009/0012657 A1* | 1/2009 | Knotts et al. ...................... 701/3 |
| 2009/0326745 A1* | 12/2009 | Ramos et al. ................... 701/14 |
| 2010/0227516 A1* | 9/2010 | Kinoshita et al. ............... 440/87 |
| 2010/0275575 A1* | 11/2010 | Brown ............................. 60/204 |
| 2010/0287905 A1* | 11/2010 | Shepler ........................ 60/39.24 |
| 2011/0202251 A1* | 8/2011 | Luppold ....................... 701/100 |

OTHER PUBLICATIONS

STIC EIC Fast and Focused Search Report—U.S. Appl. No. 12/775,586, Dated Aug. 15, 2013.*

* cited by examiner

| TRIM PHASEOUT – NO FLATS ||
|---|---|
| TLA | Trim |
| Idle Flat | 0 |
| TLAX | TRMX |
| Maximum Takeoff Flat | 0 |

Fig. 4

| FLAT TRIM |||
|---|---|---|
| TLA | TLA (degrees) | FLTTRM |
| Idle Flat | 33 | 0 |
| Maximum Cruise Angle – 1° | 61 | 1 |
| Maximum Cruise Angle + 1° | 63 | -1 |
| Maximum Climb Angle – 1° | 69 | 1 |
| Maximum Climb Angle + 1° | 71 | -1 |
| Maximum Takeoff Flat | 78 | 0 |

Fig. 5

| TRIM PHASEOUT – WITH FLATS |||
|---|---|---|
| TLA | TLA (degrees) | PHSTRM |
| 0 | 0 | 0 |
| Idle Flat | 33 | 0 |
| TLA1 | TLA1 | PHSVAL |
| Maximum Takeoff Flat | 78 | 0 |
| 90 | 90 | 0 |

Fig. 6

TURBINE ENGINE THRUST SCHEDULING

CROSS-REFERENCE TO RELATED APPLICATION

This application claims priority from U.S. Provisional Patent Application Ser. No. 61/176,680, filed May 8, 2009, which is incorporated herein in its entirety by reference.

BACKGROUND OF THE INVENTION

This invention relates generally to gas turbine engine thrust scheduling, and more particularly to systems and methods for smoothing thrust inputs to gas turbine engines.

One or more throttle levers, such as those found in the cockpit of gas turbine engine powered aircraft, may be used by an operator, such as a pilot, to command one or more turbine engines to a desired thrust to achieve a particular system or aircraft performance, such as maximum cruise. This thrust may be obtained by placing the throttle, either manually or via computer controlled actuation, in a predetermined position, such as the maximum cruise position.

To reduce pilot workload, auto-throttle systems have been developed to electronically control the throttle lever position for a gas turbine engine. Such systems may involve the use of one or more computers, software, memory, and actuators, such as torque motors, to automatically move the throttle lever for the pilot to a particular throttle lever position. Such systems may provide "coarse" and "fine" throttle lever movements for the pilot. For situations where "fine" throttle movements are required, rather than physically moving the throttle lever, the auto-throttle system may send a "TLA fine trim" signal to an engine controller, such as a Full Authority Digital Engine Controller (FADEC), which may then add the value of the "TLA fine trim" signal to a measured throttle lever angle (TLA) to achieve the desired setting.

On most auto-throttle equipped aircraft, however, when the auto-throttle system disengages (whether manually by the pilot or automatically as a result of a pre-programmed event), the "TLA fine trim" setting is automatically set immediately to zero by the engine control system, which may cause a sudden step-change in thrust (i.e., "bump"), which, in turn, may cause a change to a different thrust mode (i.e., from cruise thrust to climb thrust) according to a preprogrammed thrust schedule. To compensate, the pilot may be required to make a manual throttle lever adjustment to return the actual thrust of the engine to that which existed when the auto-throttle system was engaged. Thus, a system and method that automatically eliminates the need for an immediate manual adjustment of the thrust of a gas turbine engine upon disengagement of an auto-throttle system is needed.

In addition, during manual operation of a gas turbine engine, the sensitivity of the throttle lever/engine combination is such that it may be difficult for a pilot to position the throttle lever at a particular TLA to achieve a particular thrust, such as the maximum cruise thrust position or the maximum climb thrust position. As a result, engine component life may be negatively impacted if the TLA is consistently positioned above the desired throttle position because doing so may cause unnecessary wear on the engine due to, for example, higher exhaust gas temperatures and engine rotational speeds. On the other hand, if the TLA is consistently below the desired throttle position, aircraft performance may be less than expected.

To compensate for these occurrences, the TLA-thrust relationship may include "flats" at various thrust levels, as shown in FIG. 1, to permit a pilot to more easily obtain a desired throttle setting during manual operation of a gas turbine engine. The "flats" effectively provide the pilot with relatively wide, angular latitude at specific thrust points to position the throttle to achieve a desired thrust.

However, some auto-throttle systems cannot accommodate "flats" in the TLA-thrust relationship at all thrust points. One example of an auto-throttle system that does not include "flats" at all thrust points in shown in FIG. 2, where the throttle lever angle varies with changes in thrust according to the slope of the line at each point in the TLA-thrust curve between idle thrust and maximum takeoff thrust. Consequently, when operating a gas turbine engine in manual mode (i.e., with auto-throttle disengaged), a system and method is needed that permits a pilot to easily achieve a particular throttle setting on auto-throttle-equipped aircraft that cannot tolerate "flats" in the TLA-thrust relationship. In addition, to continue to operate a gas turbine engine manually without incurring sudden step-changes or "bumps" in thrust during subsequent movements of the throttle lever, the "TLA fine trim" setting may be gradually removed according to the teachings of one or more embodiments of the present invention.

SUMMARY OF THE INVENTION

In one embodiment, a method for operating a gas turbine engine comprises, upon disengagement of an auto-throttle system, determining a first trim setting corresponding to a TLA setting, determining a second trim setting, where the second trim setting reduces to zero during successive manual throttle lever movements, determining a third trim setting comprising a combination of the first trim setting and the second trim setting, and applying the third trim setting to the TLA setting to transition from auto-throttle to manual operation of the engine while maintaining engine thrust.

The first, second, and third trim settings may each be determined by an engine controller connected to the engine. The first trim setting may correspond to at least one flat in a TLA-thrust relationship defining manual operation of the engine. The at least one flat may lie between engine idle thrust and maximum takeoff thrust. Each of the at least one flat may correspond to a thrust level associated with a plurality of TLA settings. Each of the plurality of TLA settings may comprise a range of approximately 2 degrees. The second trim setting may comprise subtracting, by the engine controller, the first trim setting from the TLA setting. The auto-throttle system may comprise a TLA-thrust relationship defining engine thrust that increases with increasing TLA between idle thrust and maximum takeoff thrust. The engine controller may determine the first trim setting by interpolating among a plurality of trim settings in a dynamic lookup table.

In another embodiment, a method for operating a gas turbine engine comprises, upon disengagement of an auto-throttle system, determining by, for example, an engine controller connected to the gas turbine engine, a TLA trim setting corresponding to a measured TLA, where the TLA trim setting reduces to zero during successive manual throttle lever movements, and applying the TLA trim setting to the measured TLA by, for example, the engine controller, to transition from auto-throttle to manual operation of the engine while maintaining engine thrust.

The method may further comprise a lookup cycle corresponding to a current measured TLA, where for each lookup cycle, an engine controller connected to the engine may create a lookup table comprising a plurality of TLA trim settings as a function of TLA, and where the engine controller may determine a current TLA trim setting corresponding to the current measured TLA. The engine controller may set the TLA trim setting in the lookup table equal to zero for TLA's corresponding to engine idle thrust and to maximum takeoff thrust, and to the current TLA trim setting for TLA's between engine idle thrust and maximum takeoff thrust.

In another embodiment, a method for operating a gas turbine engine comprises automatically maintaining engine thrust when transitioning to manual operation of the engine following disengagement of an aircraft auto-throttle system, the method comprising substituting a first TLA trim setting computed by an engine controller for a last TLA trim setting provided by the auto-throttle system, adding, by the engine controller, the first TLA trim setting to a measured TLA setting to form a new TLA setting, and applying the new TLA setting to the engine to maintain engine thrust, wherein subsequent manual throttle movements gradually reduces the first trim setting to zero.

The first trim setting may comprise trim corresponding to the introduction of at least one flat in a TLA-thrust relationship defining manual operation of the engine. The at least one flat may lie between engine idle thrust and maximum takeoff thrust. Each of the at least one flat may correspond to a thrust level associated with a plurality of TLA settings. Each of the plurality of TLA settings may comprise a range of approximately 2 degrees. When the auto-throttle system disengages, the engine controller may set one component of the first trim setting equal to the last trim setting minus a trim corresponding to at least one flat in a TLA-thrust relationship defining manual operation of the engine. The auto-throttle system may comprise a TLA-thrust relationship defining engine thrust that increases with increasing TLA between idle thrust and maximum takeoff thrust. The engine controller may determine at least one component of the first trim setting by interpolating among a plurality of trim settings in a dynamic lookup table. The auto-throttle system may comprise a first TLA-thrust relationship defining engine thrust that increases with increasing TLA between idle thrust and maximum takeoff thrust, and where manual operation of the engine may correspond to a second TLA-thrust relationship defining a plurality of constant levels of engine thrust corresponding to a plurality of ranges of TLA settings.

BRIEF DESCRIPTION OF THE DRAWINGS

For a better understanding of the invention, reference may be had to preferred embodiments shown in the following drawings in which:

FIG. 4 illustrates an exemplary dynamic lookup table that a FADEC may use to transition a gas turbine engine from auto-throttle mode to manual mode;

FIG. 5 illustrates another exemplary dynamic lookup table that a FADEC may use to transition a gas turbine engine from auto-throttle mode to manual mode;

FIG. 6 illustrates yet another exemplary dynamic lookup table that a FADEC may use to transition a gas turbine engine from auto-throttle mode to manual mode.

DETAILED DESCRIPTION

Figure 1:
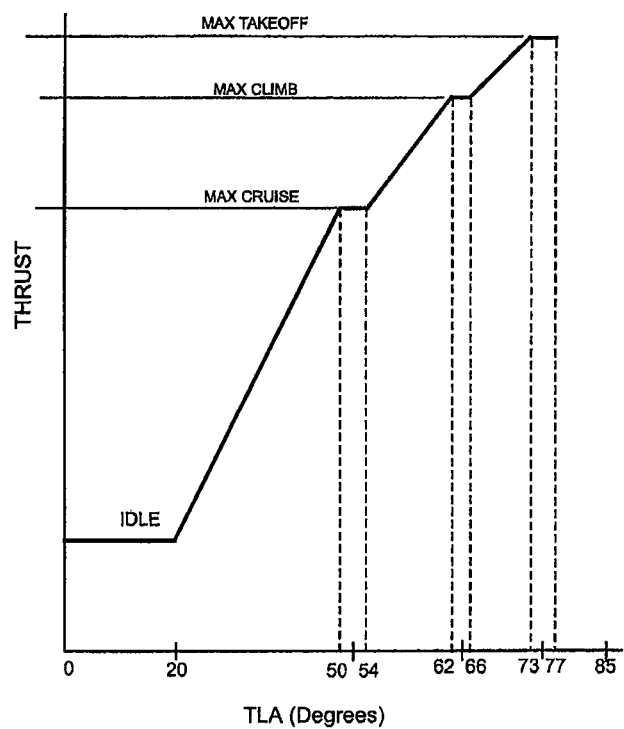
FIG. 1 illustrates a TLA-thrust profile for a gas turbine engine having "flats" at certain thrust points.
Figure 2:
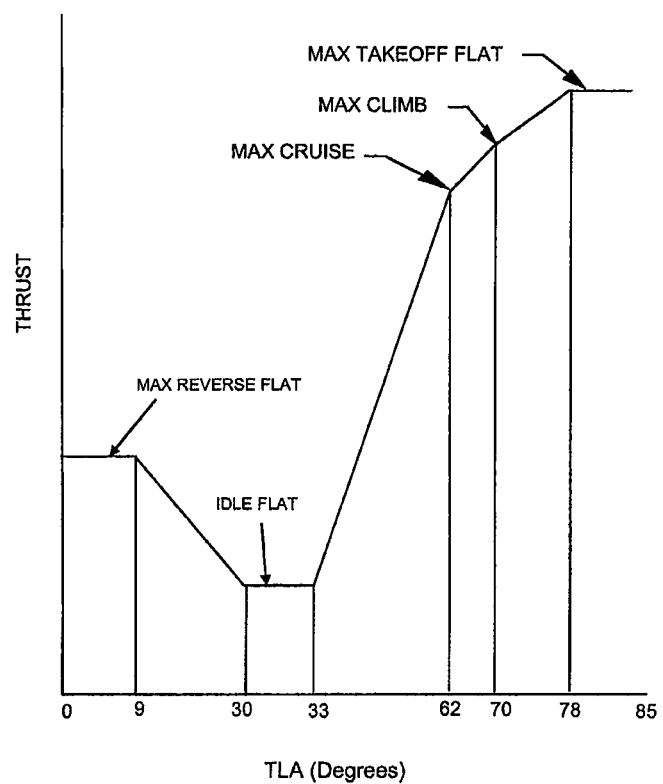
FIG. 2 illustrates a TLA-thrust profile without "flats" at certain thrust points.
Figure 3:
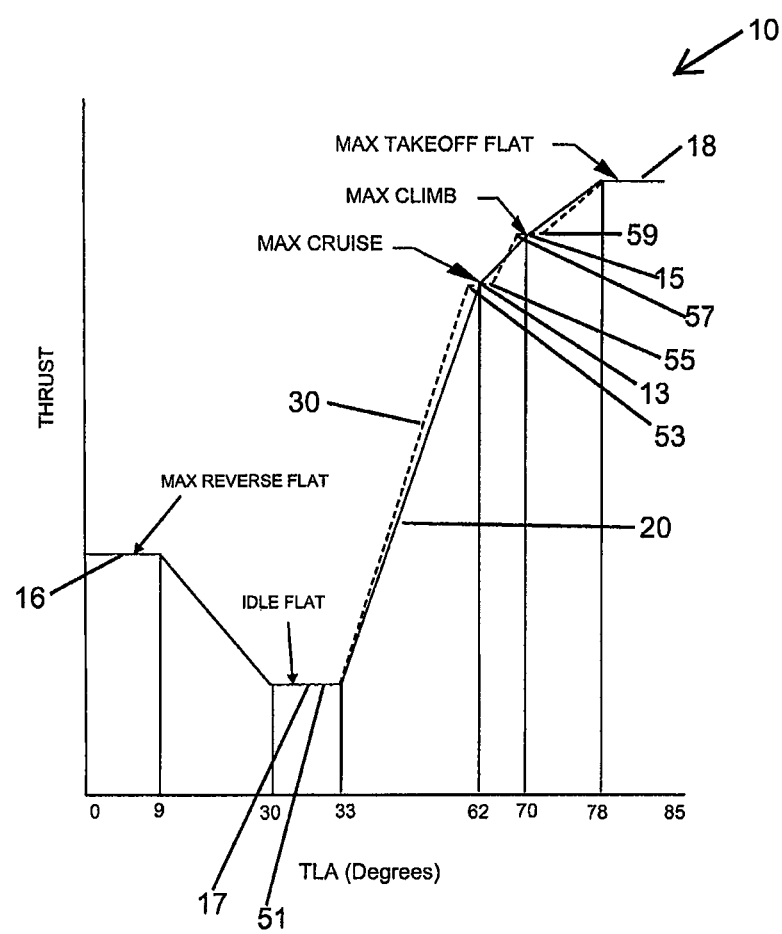
FIG. 3 illustrates another TLA-thrust profile with and without "flats;"

Turning now to the figures, wherein like reference numerals refer to like elements, there is illustrated in FIG. 3 gas turbine engine thrust schedule 10 incorporating an embodiment of the present invention. In particular, thrust schedule 10 of FIG. 3 includes TLA-thrust profile 20 for an auto-throttle mode that does not include "flats" at certain engine thrust settings, such as at maximum cruise 13 and maximum climb 15, and TLA-thrust profile 30 for a manual operating mode that includes "flats" at each of these thrust settings. When the auto-throttle system is engaged, the auto-throttle system may have the characteristics of TLA-thrust profile 20 where the control system behaves as if there are no "flats" at maximum cruise 13 and maximum climb 15 thrust settings. However, when the auto-throttle system is not in use, the TLA-thrust relationship may change to include cruise and climb "flats" so as to have the characteristics of TLA-thrust profile 30. In this way, an aircraft control system may accommodate both an auto-throttle thrust schedule that does not include flats at certain power settings as well as a manual mode thrust schedule that may include "flats" at these power settings. In one embodiment, cruise and climb TLA "flats" may be programmed to be approximately +/−1 degree each.

On aircraft having an auto-throttle system, a "transition" from an auto-throttle operating mode to a manual throttle operating mode occurs whenever the auto-throttle system disengages, whether manually by the pilot or automatically as a result of a pre-programmed event. At the moment of disengagement, the auto-throttle system no longer automatically moves the throttle lever or transmits a "TLA fine trim" signal to the engine control system. In one embodiment, the "TLA fine trim" value may range from approximately +/−2 degrees of a predetermined TLA for a thrust setting, such as maximum cruise.

To avoid requiring that the pilot make manual adjustments to the throttle position upon loss of auto-throttle and the attendant loss of "TLA fine trim" to maintain, for example, maximum cruise thrust, the engine controller, such as a FADEC, may be programmed to intervene and take over that responsibility. A FADEC works by receiving multiple electronic inputs (including TLA), analyzing the input data, and issuing electronic commands that control various engine functions, such as fuel flow, for example, to achieve optimum engine performance for a given flight condition. A FADEC includes an electronic engine controller comprising at least one CPU, memory, and a data bus for receiving input data and sending output data to control the thrust of a gas turbine engine.

In particular, to transition from an auto-throttle to a manual thrust schedule so as to maintain the same thrust setting without any noticeable thrust changes during the transition, and therefore to be completely transparent to the pilot, when the auto-throttle system disengages, the FADEC may add a new trim value to the measured TLA, where the new trim value comprises a combination of "flat trim" and "phase trim." "Flat trim" may comprise, for example, an amount ranging from approximately −1 degree to approximately +1 degree, and depends on the measured TLA. "Flat trim" may be determined by the FADEC by interpolating among "flat trim" values in a dynamic lookup table, as shown, for example, in the embodiment of FIG. 5. "Phase trim" may be determined by the FADEC, for example, at the moment the auto-throttle system disengages, and is the difference between the last "TLA fine trim" value applied to the throttle and the "flat trim" value corresponding to the last measured TLA. Consequently, the new trim value needed to eliminate a noticeable "bump" in thrust when transitioning from a TLA-thrust profile without "flats" to a TLA-thrust profile with "flats" is the computed "phase trim" plus the computed "flat trim." The FADEC may continuously, or at predetermined intervals, update and recompute the "flat trim" and "phase trim" values based on the last measured TLA.

Moreover, when the auto-throttle system disengages and stops sending a "TLA fine trim" signal to the FADEC, the FADEC may be programmed so that subsequent positive, manual throttle lever movements result in a command to increase thrust, rather than a command to decrease thrust, and does not result in an exaggerated positive thrust change due to removal of auto-throttle trim. Similarly, the FADEC may be programmed so that subsequent negative, manual throttle lever movements result in a command to decrease thrust, rather than a command to increase thrust, and do not result in an exaggerated negative thrust change due to removal of auto-throttle trim. Thus, in one embodiment, to operate the engine in manual mode while ensuring that further, manual changes in throttle lever position do not result in any unintended changes in thrust, the FADEC may be configured to drive the "phase trim" value gradually toward zero during each successive movement of the throttle lever. The FADEC may also set the trim setting to zero when idle or takeoff thrust or "flat" is commanded.

As shown in FIG. 3, TLA-thrust profile 20 and TLA-thrust profile 30 may each include one or more "flats" corresponding to constant engine thrust having relatively wide TLA's, such as the thrust setting for maximum reverse 16, engine idle 17, and maximum takeoff 18.

In one embodiment, thrust schedule 10 includes TLA-thrust profile 20 and TLA-profile 30 to permit smooth, automatic thrust transitioning from auto-throttle mode to manual mode, and also to permit "flats" at a variety of manual thrust settings to reduce pilot workload when operating the engine in manual mode. In another embodiment, thrust schedule 10 includes either TLA-thrust profile 20 or TLA-thrust profile 30.

Although "flats" are not required for manual operation of the engine after disengaging the auto-throttle system, gradually reducing the "TLA fine trim" will avoid unintended changes in thrust arising from subsequent manual throttle movements in either direction. To do this, by way of example, when the auto-throttle system disengages, the FADEC may create "trim phaseout" table 40, as shown in FIG. 4, which may comprise preprogrammed trim values as a function of TLA as well as variable information obtained on the fly, such as the measured TLA and the TLA trim signal that the auto-throttle system sends to the FADEC.

For example, as shown in FIG. 4, TLA at idle flat 41 may correspond to trim setting 42 equal to 0, and TLA at maximum takeoff flat 45 may correspond to trim setting 46 equal to 0. In addition, measured TLA 43, which is identified as the variable "TLAX" in FIG. 4, and TLA trim 44, which is the variable "TRMX" in FIG. 4, may correspond to the measured TLA and the "TLA fine trim" value when the auto-throttle system disengages. Thus, for measured TLA between idle flat 41 and maximum takeoff flat 45, TLA movements in either direction will cause trim magnitude to decrease. The FADEC may continually adjust the middle point in the table to be equal to the current TLA and trim, which may keep the magnitude of the trim from ever increasing if the pilot changes TLA direction. This method causes trim to be removed as gradually as possible while still ensuring that trim will be zero when the idle or takeoff flat is reached.

To provide TLA "flats" while in manual mode but no "flats" in auto-throttle mode adds complexity to the auto-throttle-to-manual transition. For example, the shape of TLA-thrust profile 20 must be changed to form TLA-thrust profile 30 and done so in a manner that causes no sudden thrust change at the moment of auto-throttle disengagement and that also provides predictable operation to the pilot. Additional complexity may arise from phasing out the auto-throttle-supplied "TLA fine trim" to operate the engine in manual mode while ensuring that further, manual changes in throttle lever position do not result in any unintended changes in thrust.

To cause a change in the shape of TLA-thrust profile 20 to form TLA-thrust profile 30 having TLA "flats" for use during manual operation and also to phase out the "TLA fine trim," as described above, the FADEC may add a new trim value to the last measured TLA, where the new trim value comprises a combination of "flat trim" and "phase trim." To accomplish this, the FADEC may use data in a combination of two dynamic lookup tables, one for "flat trim" and one for "phase trim."

In the embodiment of FIG. 5, for example, "flat trim" table 50 may include "flat trim" settings (identified, for example, by the variable name FLTTRM) of approximately +1 degree for "flat trim" 54, 58, approximately −1 degree for "flat trim" 56, 60, zero degrees for "flat trim" 52, and zero degrees for "flat trim" 62. These "flat trim" values correspond in table 50 to maximum cruise angle 53, 57, maximum cruise angle 55, 59, idle flat 51, and maximum takeoff flat 61, respectively.

In one embodiment, as shown in FIG. 5, TLA at idle flat 51 is approximately 33 degrees, TLA at maximum cruise angle 53 is approximately 61 degrees, TLA at maximum cruise angle 55 is approximately 63 degrees, TLA at maximum climb angle 57 is approximately 69 degrees, TLA at maximum climb angle 59 is approximately 71 degrees, and TLA at maximum takeoff flat 61 is approximately 78 degrees. "Flat trim" table 50 shows, therefore, that any throttle lever angle (TLA) from, for example, approximately 61 to 63 degrees for maximum cruise angle 53, 55 will result in an applied TLA of approximately 62 degrees for maximum cruise thrust.

To transition from auto-throttle to manual, and thus, from TLA-thrust profile 20 without "flats" to TLA-thrust profile 30 having TLA "flats," the FADEC may also use "trim phaseout" table 70 of FIG. 6. At the moment auto-throttle is disengaged, the value of "phase trim" of FIG. 6 (identified, for example, by the variable name PHSTRM, where PHSTRM=PHSVAL for idle flat<TLA<maximum takeoff flat) may be set to the "TLA fine trim" value when the auto-throttle system disengages minus the required "flat trim" that the FADEC determines through interpolation of the values in FIG. 5 for the measured TLA at the moment the auto-throttle disengages. This delta trim (i.e., "phase trim") may then be phased out during continued manual operation of the engine in the manner described earlier for FIG. 4. The result is a smooth transition from auto-throttle mode to manual mode, together with gradual phase out of the trim during subsequent manual movements of the throttle lever.

For example, as shown in "phase trim" table 70 in the embodiment of FIG. 6, TLA at "0" 71 may correspond to "phase trim" (i.e., PHSTRM) 72 equal to zero, TLA at idle flat 73 may correspond to "phase trim" 74 equal to zero, TLA at maximum takeoff flat 77 may correspond to "phase trim" 78 equal to zero, and TLA at "90" 79 may correspond to "phase trim" 80 equal to zero. In addition, measured TLA 75, which is identified as the variable "TLA1" in FIG. 6, and "phase trim" 76, which is identified as the variable PHSVAL in FIG. 6, may correspond to the measured TLA and the "phase trim" value computed as shown above. As shown in FIG. 6, in one embodiment, TLA at "0" 71 is zero degrees, TLA at idle flat 73 is 33 degrees, TLA at maximum takeoff flat 77 is 78 degrees, and TLA at "90" 79 is 90 degrees. Thus, for measured TLA between idle flat 73 and maximum takeoff flat 77, TLA movements in either direction will cause trim magnitude to decrease. The FADEC may continually adjust the middle point in the table to be equal to the current TLA and trim, which may keep the magnitude of the trim from ever increasing if the pilot changes TLA direction. This method causes trim to be removed as gradually as possible while still ensuring that trim will be zero when the idle or takeoff flat is reached.

Figure 7:
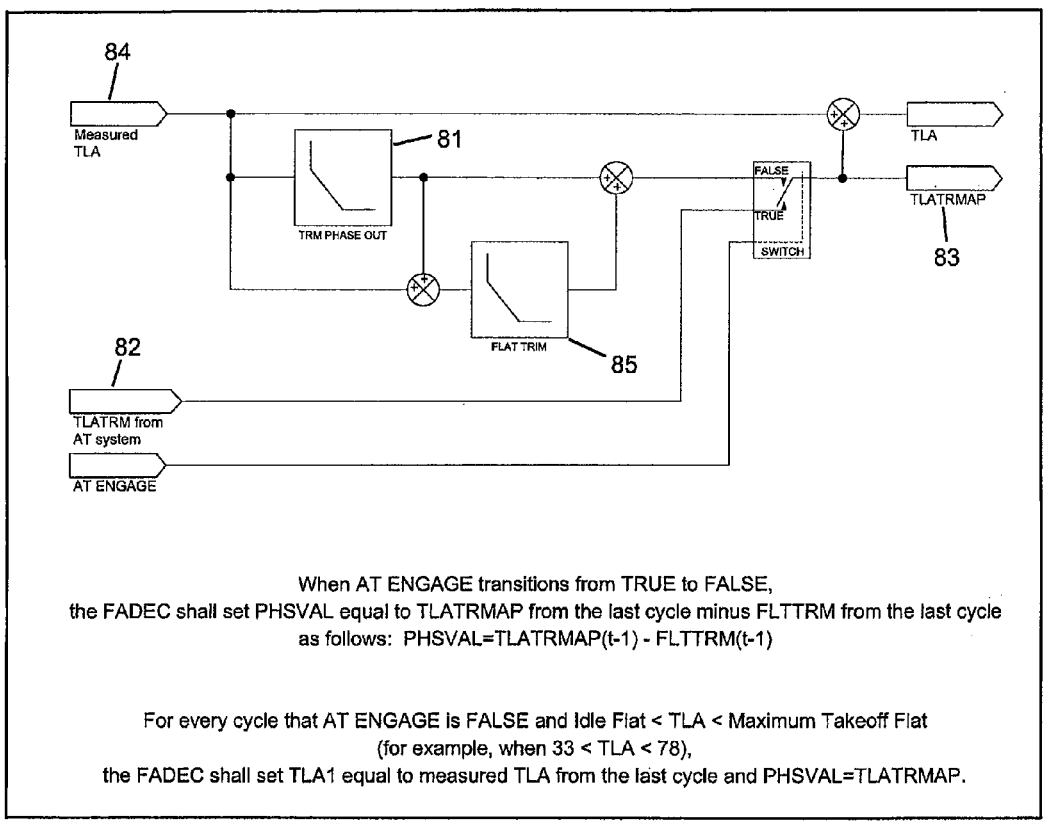
FIG. 7 illustrates a logic diagram of one embodiment of the present invention.

In one embodiment, an engine transition scheduling system may have the logic shown in FIG. 7. In particular, when auto-throttle is engaged, the FADEC may add together the measured TLA 84 and the "TLA fine trim" (TLATRMAP) 83 to produce the desired throttle setting. When the auto-throttle system disengages, the FADEC may take the value for "flat trim" 85 (interpolated using FIG. 5) and the value for "phase trim" (determined using FIG. 6) to form the new "TLA fine trim" and may add that value to the measured TLA 84 to produce the desired throttle setting in a transparent manner to the pilot to avoid any noticeable changes in thrust.

Using the arbitrary nomenclature shown in FIG. 7, "flat trim" 85 may be assigned the variable name FLTTRM and as described above, may be computed by the FADEC using "flat trim" table 50 of FIG. 5. "Phase trim" 81 may be assigned the variable name PHSTRM and may be computed by the FADEC using "trim phaseout" table 70 of FIG. 6.

As shown in FIGS. 6-7, "phase trim" 81 may equal a variable, arbitrarily called PHSVAL, for measured TLA's between idle flat 73 and maximum takeoff flat 77. In one embodiment, when auto-throttle disengages, the FADEC will set "phase trim" (i.e., PHSVAL) equal to the last "TLA fine trim" applied (i.e., TLATRMAP(t−1) where "t−1" indicates last cycle) minus the "flat trim" (FLTTRM(t−1), where "t−1" indicates last cycle) interpolated using FIG. 5.

To determine the new throttle lever angle (TLA) and the new "TLA fine trim" (TLATRMAP) to eliminate a noticeable "bump" in thrust, the FADEC may add the "flat trim" value with the "phase trim" value, and add this result to measured TLA.

While specific embodiments of the invention have been described in detail, it will be appreciated by those skilled in the art that various modifications and alternatives to those details could be developed in light of the overall teachings of the disclosure. Accordingly, the particular invention disclosed is meant to be illustrative only and not limiting as to the scope of the invention which is to be given the full breadth of the appended claims and any equivalents thereof.

What is claimed is:

1. A method for operating a gas turbine engine, comprising:
    before disengagement of an auto-throttle system, receiving, by an engine controller, a Throttle Lever Angle (TLA) setting and a TLA fine trim setting applied by the auto-throttle system that together provide a desired engine thrust;
    upon disengagement of the auto-throttle system, determining, a first trim setting corresponding to the TLA setting;
    determining, by the engine controller, a second trim setting defined from the first trim setting and the TLA fine trim setting, wherein the second trim setting gradually reduces to zero during successive manual throttle lever movements;
    determining, by the engine controller, a third trim setting comprising a combination of the first trim setting and the second trim setting; and
    applying the third trim setting to the TLA setting as a substitute for the fine trim setting to smoothly transition from auto-throttle to manual operation of the engine while maintaining engine thrust.

2. The method of claim 1, wherein the first trim setting corresponds to at least one flat in a TLA-thrust relationship defining manual operation of the engine.

3. The method of claim 2, wherein the at least one flat lies between engine idle thrust and maximum takeoff thrust.

4. The method of claim 2, wherein each of the at least one flat corresponds to a thrust level associated with a plurality of TLA settings.

5. The method of claim 4, wherein each of the plurality of TLA settings comprises a range of 2 degrees.

6. The method of claim 1, wherein the second trim setting comprises subtracting, by the engine controller, the first trim setting from the TLA setting.

7. The method of claim 1, wherein the auto-throttle system comprises a TLA-thrust relationship defining engine thrust that increases with increasing TLA between idle thrust and maximum takeoff thrust.

8. The method of claim 1, wherein the engine controller determines the first trim setting by interpolating among a plurality of trim settings in a dynamic lookup table.

9. A method for operating a gas turbine engine, comprising:
    upon disengagement of an auto-throttle system, determining by an engine controller, a Throttle Lever Angle (TLA) trim setting corresponding to a measured TLA, wherein the TLA trim setting gradually reduces to zero during successive manual throttle lever movements; and
    applying the TLA trim setting to the measured TLA to transition from auto-throttle to manual operation of the engine while maintaining engine thrust;
    a lookup cycle corresponding to a current measured TLA, wherein for each lookup cycle, the engine controller creates a lookup table comprising a plurality of TLA trim settings as a function of TLA, wherein the engine controller determines a current TLA trim setting corresponding to the current measured TLA;
    wherein the engine controller sets the TLA trim setting in the lookup table equal to zero for TLA's corresponding to engine idle thrust and to maximum takeoff thrust, and to the current TLA trim setting for TLA's between engine idle thrust and maximum takeoff thrust;
    wherein the engine controller is a computer processor.

10. A method for operating a gas turbine engine, comprising:
    automatically maintaining engine thrust when transitioning to manual operation of the engine following disengagement of an aircraft auto-throttle system, comprising
    substituting a first Throttle Lever Angle (TLA) trim setting computed by an engine controller for a last TLA trim setting provided by the auto-throttle system;
    adding, by the engine controller, the first TLA trim setting to a measured TLA setting to form a new TLA setting; and
    applying the new TLA setting to the engine to maintain engine thrust, wherein subsequent manual throttle movements gradually reduces the first trim setting to zero.

11. The method of claim 10, wherein the first trim setting comprises trim corresponding to the introduction of at least one flat in a TLA-thrust relationship defining manual operation of the engine.

12. The method of claim 11, wherein the at least one flat lies between engine idle thrust and maximum takeoff thrust.

13. The method of claim 11, wherein each of the at least one flat corresponds to a thrust level associated with a plurality of TLA settings.

14. The method of claim 13, wherein each of the plurality of TLA settings comprises a range of 2 degrees.

15. The method of claim 11, wherein when the auto-throttle system disengages, the engine controller sets one component of the first trim setting equal to the last trim setting minus a trim corresponding to at least one flat in a TLA-thrust relationship defining manual operation of the engine.

16. The method of claim 10, wherein the auto-throttle system comprises a TLA-thrust relationship defining engine thrust that increases with increasing TLA between idle thrust and maximum takeoff thrust.

17. The method of claim 10, wherein the engine controller determines at least one component of the first trim setting by interpolating among a plurality of trim settings in a dynamic lookup table.

18. The method of claim 10, wherein the auto-throttle system comprises a first TLA-thrust relationship defining engine thrust that increases with increasing TLA between idle thrust and maximum takeoff thrust, and wherein manual operation of the engine corresponds to a second TLA-thrust relationship defining a plurality of constant levels of engine thrust corresponding to a plurality of ranges of TLA settings.

19. The method of claim 10, wherein subsequent manual throttle movements gradually reduces the first trim setting to zero includes
    (a) measuring the TLA setting corresponding to each manual throttle movement, and
    (b) for each measured TLA setting and corresponding applied TLA setting between an idle thrust setting and a maximum thrust setting, interpolating by the engine controller between an applied TLA trim setting and zero to obtain a new TLA trim setting that is less in magnitude than the applied TLA trim setting.

20. The method of claim 1, including the steps of
    (a) measuring the TLA setting corresponding to each manual throttle movement, and
    (b) for each measured TLA setting and corresponding applied TLA setting between an idle thrust setting and a maximum thrust setting, interpolating by the engine controller between an applied third trim setting and zero to obtain a new TLA trim setting that is less in magnitude than the applied third trim setting.

21. The method of claim 9, including the steps of
    (a) measuring the TLA setting corresponding to each manual throttle movement, and
    (b) for each measured TLA setting and corresponding applied TLA setting between an idle thrust setting and a maximum thrust setting, interpolating by the engine controller between the applied TLA trim setting and zero to obtain a new TLA trim setting that is less in magnitude than the applied TLA trim setting.

* * * * *